UNITED STATES PATENT OFFICE.

HELEN MAR VAN ETTEN, OF MORAVIA, NEW YORK.

ARTIFICIAL FUEL.

SPECIFICATION forming part of Letters Patent No. 638,612, dated December 5, 1899.

Application filed October 8, 1898. Serial No. 693,052. (No specimens.)

*To all whom it may concern:*

Be it known that I, HELEN MAR VAN ETTEN, a citizen of the United States, residing at Moravia, in the county of Cayuga and State of New York, have invented an Improved Artificial Fuel, of which the following is a specification.

This invention relates to the class of artificial fuels in which mineral coal-dust is utilized to serve as the base or main constituent of the composition forming the fuel; and the invention consists in a novel composition of the coal-dust or slack with certain materials which contribute to the combustion of said dust or slack and in a novel treatment of the materials during the process of combining them, as hereinafter described and claimed.

In practicing my invention with dust or slack of different kinds of mineral coal I have found it expedient to modify to some extent the materials and treatment of the composition, as I will now describe.

For treating anthracite coal-dust or slack I proceed as follows: I mix with said dust or slack a sufficient quantity of water to form a thin pulp, which I heat to 212° Fahrenheit in a kettle or other suitable receptacle, and while maintained at said temperature I add thereto a mixture of liquid asphaltum and alum, which mixture is prepared by gradually heating it in a kettle to boiling. After the entire mass has been boiled about one-half hour I add to said mass sal-soda, and while continuing the boiling of the mass I further add thereto whiting and sulfur and thoroughly stir the mass, so as to effectually commingle the ingredients. The heating of the compound is continued to expel the water therefrom and reduce the compound to a plastic condition, in which it is molded into blocks of suitable sizes.

The proportions of the aforesaid ingredients are about as follows: one ton of coal-dust or slack, five gallons of asphaltum, ten pounds of alum, ten pounds of sal-soda, five pounds of sulfur, and five pounds of whiting.

When bituminous coal-dust or slack is to be the base of the composition, the artificial supply of bitumen is not required in the composition, and therefore the asphaltum is omitted in the manufacture of the fuel. I use, however, ten pounds of alum dissolved in water, which solution I mix with one ton of the coal-dust or slack previously mixed with sufficient water to form a thin pulp.

In order to cause the alum to unite with the bitumen in the coal-dust or slack, I boil the aforesaid mass and then add thereto ten pounds of sal-soda, and from thence on I continue the process by the addition of sulfur and whiting in the same manner as in the treatment of the anthracite dust or slack.

When both anthracite and bituminous coal-dust or slack are to be used together, I take one-third of a ton of bituminous slack and add first to the said slack four pounds of alum, made fine and dissolved by boiling, using water sufficient to make a thin pulp, which is stirred thoroughly, and then add two-thirds of a ton of anthracite slack that has been mixed with a boiling-hot solution, made by boiling four pounds of sal-soda and eight pounds of whiting together, until the whiting is dissolved in a milky state. There must be sufficient of the solution formed by mixing the sal-soda and whiting together to thoroughly mix with every part of the anthracite, and then the anthracite and bituminous mixtures are added together.

The composition formed by mixing the anthracite and bituminous is not to be molded or dried, but is to be burned in furnaces. It can be used as soon as made. It will make steam equal to the best anthracite coal and will hold fire much longer at a minimum cost. This composition can be varied, equal parts of the slack being used, and to the bituminous slack can be added the same ratio of alum, soda, and whiting and then added to the slacks in the same way as above described. If the composition is to be molded, five pounds of sulfur is added by being boiled with the soda and whiting.

In case the coal-dust contains lignite, for which sulfur has an affinity, I add to one ton of the coal-dust, after it has been saturated and heated as hereinbefore described, ten pounds of sulfur boiled in water and introduced in its heated condition into the hot and wet mass of coal-dust. After the mass has been thus treated I continue to boil it about one-half hour, and then add to it five gallons of liquid asphaltum or bitumen, which I prepare by boiling it with ten pounds of alum, and after continuing the boiling of the mass for a further half-hour I add thereto ten pounds of sal-soda, and subsequently while still at a boiling heat I further add to the mass ten pounds of whiting prepared for that purpose by being boiled and rendered fluid.

The boiling of the compound is to be continued until it is rendered plastic and in proper condition to be molded into blocks of the desired shape and size.

It is obvious that the proportions of the ingredients may be varied according to the character or quality of the coal-dust or slack, and I therefore do not limit myself in that respect.

What I claim as my invention is—

1. The composition for artificial fuel consisting of mineral coal-dust or slack, bitumen, alum, sal-soda, sulfur and whiting.

2. The treatment of anthracite coal-dust or slack by mixing therewith sufficient water to impart a pulpy character to the mass, then boiling said mass and while maintained at boiling temperature adding thereto successively a solution of alum and asphaltum, sal-soda, whiting and sulfur and in the meantime stirring said mass as set forth.

3. A composition for artificial fuel consisting of bituminous and anthracite coal-dust or slack, alum, sal-soda, and whiting.

In testimony whereof I affix my signature in the presence of two witnesses.

HELEN MAR VAN ETTEN.

Witnesses:
JOSIE COOK,
DELIA D. CUYKENDALL.